United States Patent [19]
Reber et al.

[11] Patent Number: 5,930,767
[45] Date of Patent: Jul. 27, 1999

[54] TRANSACTION METHODS SYSTEMS AND DEVICES

[75] Inventors: William Louis Reber, Schaumburg, Ill.; Cary Drake Perttunen, Shelby Township, Mich.

[73] Assignee: Motorola, Inc., Schaumburg, Ill.

[21] Appl. No.: 08/858,184

[22] Filed: May 28, 1997

[51] Int. Cl.⁶ ................................................. G06F 17/00
[52] U.S. Cl. .............................. 705/26; 380/24; 380/25; 380/23
[58] Field of Search ................................ 705/26, 44, 39; 380/24, 25, 4, 52, 49, 23; 395/200.33, 200.47, 200.49

[56] References Cited

U.S. PATENT DOCUMENTS

| | | | |
|---|---|---|---|
| 3,668,312 | 6/1972 | Yamamoto et al. | 348/17 |
| 3,868,514 | 2/1975 | Israelsson | 250/566 |
| 4,031,358 | 6/1977 | Thorniley | 235/472.03 |
| 4,465,926 | 8/1984 | Apitz et al. | 235/462.49 |
| 4,599,489 | 7/1986 | Cargile | 380/4 |
| 4,621,259 | 11/1986 | Schepers et al. | 345/180 |
| 4,720,860 | 1/1988 | Weiss | 380/23 |
| 4,816,904 | 3/1989 | McKenna et al. | 348/13 |
| 4,841,132 | 6/1989 | Kajitani et al. | 235/462.46 |
| 4,926,255 | 5/1990 | Von Kohorn | 348/13 |
| 4,947,028 | 8/1990 | Gorog | 235/380 |
| 5,168,520 | 12/1992 | Weiss | 380/23 |
| 5,180,192 | 1/1993 | Herbert | 283/101 |
| 5,247,347 | 9/1993 | Litteral et al. | 348/7 |
| 5,249,044 | 9/1993 | Von Kohorn | 348/12 |
| 5,287,181 | 2/1994 | Holman | 348/473 |
| 5,319,454 | 6/1994 | Schutte | 348/5.5 |
| 5,357,276 | 10/1994 | Banker et al. | 348/7 |
| 5,438,355 | 8/1995 | Palmer | 348/1 |
| 5,446,490 | 8/1995 | Blahut et al. | 348/7 |
| 5,450,491 | 9/1995 | McNair | 380/25 |
| 5,483,052 | 1/1996 | Smith, III et al. | 235/462.49 |
| 5,515,270 | 5/1996 | Weinblatt | 705/14 |
| 5,570,412 | 10/1996 | LeBlanc | 455/456 |
| 5,640,193 | 6/1997 | Wellner | 348/7 |
| 5,715,314 | 2/1998 | Payne et al. | 380/24 |
| 5,729,594 | 3/1998 | Klingman | 379/93.12 |
| 5,748,740 | 5/1998 | Curry et al. | 380/25 |
| 5,815,577 | 9/1998 | Clark | 380/52 |
| 5,826,241 | 10/1998 | Stein et al. | 705/26 |
| 5,832,119 | 11/1998 | Rhoads | 382/232 |

OTHER PUBLICATIONS

USA Today, Friday Jan. 24, 1997, p. 3A, and several pages of Internet content.

*Primary Examiner*—James P. Trammell
*Assistant Examiner*—Demetra R. Smith

[57] ABSTRACT

A transaction system includes a computer (20) which performs a transaction method comprising steps of receiving a first data element indicating an item in a transaction, receiving a second data element indicating a party of the transaction, approving the transaction based upon the second data, and creating a record of the transaction. The first data element and the second data element are received via an electronic network (22). The second data element is read from a device (40) by an optical data reader (30) in communication with the electronic network (22).

23 Claims, 5 Drawing Sheets

TRANSACTION METHODS SYSTEMS AND DEVICES

RELATED APPLICATIONS

The present application is related to the following applications:

"Electronic Network Navigation Device and Method for Linking to an Electronic Address Therewith", having Ser. No. 08/710,810, filed Sep. 23, 1996;

"Methods and Systems for Providing a Resource in an Electronic Network", having Ser. No. 08/726,004, filed Oct. 4, 1996;

"An Apparatus for Reading an Electronic Network Navigation Device and a Peripheral for Use Therewith", having Serial No. 08/732,956, filed Oct. 17, 1996;

"Method, System, and Article of Manufacture for Producing a Network Navigation Device", having Ser. No. 08/744,338, filed Nov. 7, 1996; and "Bar Code Display Apparatus", having Docket No. MNE00510, filed May 28, 1997.

The subject matter of the above-identified related applications is hereby incorporated by reference into the disclosure of this application.

TECHNICAL FIELD

The present invention relates to methods, systems, and devices for performing transactions via an electronic network such as the Internet.

BACKGROUND OF THE INVENTION

Many companies have proposed services for selling products on the Internet. One such service involves offering software tools to create, host, and manage a Web site and a Web-based store to perform transactions over the Internet.

Included in the service is support for credit card purchases over the Internet. When an end user registers for the service, he/she is assigned a personal identification number as a proxy for his/her credit card number. To make a purchase over the Internet, the end user enters the personal identification number into his/her personal computer. The personal computer, in turn, communicates the personal identification number to a Web-based merchant via the Internet. The purchase is made based on the personal identification number rather than a credit card number.

Advantageously, the use of the personal identification number prevents an interception of the end user's credit card number by unauthorized parties. A drawback of using a personal identification number is that many individuals currently have other personal identification numbers and passwords to remember. Additionally, the interception of the end user's personal identification number can result in transactions by unauthorized parties. Accordingly, there is a need for improved methods, systems, and devices for Internet transactions.

BRIEF DESCRIPTION OF THE DRAWINGS

The invention is pointed out with particularity in the appended claims. However, other features of the invention will become more apparent by referring to the following detailed description in conjunction with the accompanying drawings in which:

DETAILED DESCRIPTION OF A PREFERRED EMBODIMENT

Using embodiments of the present invention, an end user is authenticated in a transaction based upon machine-readable data read by a data reader at the end user's location. Preferably, the machine-readable data includes a bar code that may be read by an optical data reader such as a bar code reader. To reduce the likelihood of unauthorized interception of a personal identification code, a time-varying bar code is used to authenticate the end user.

Figure 1:
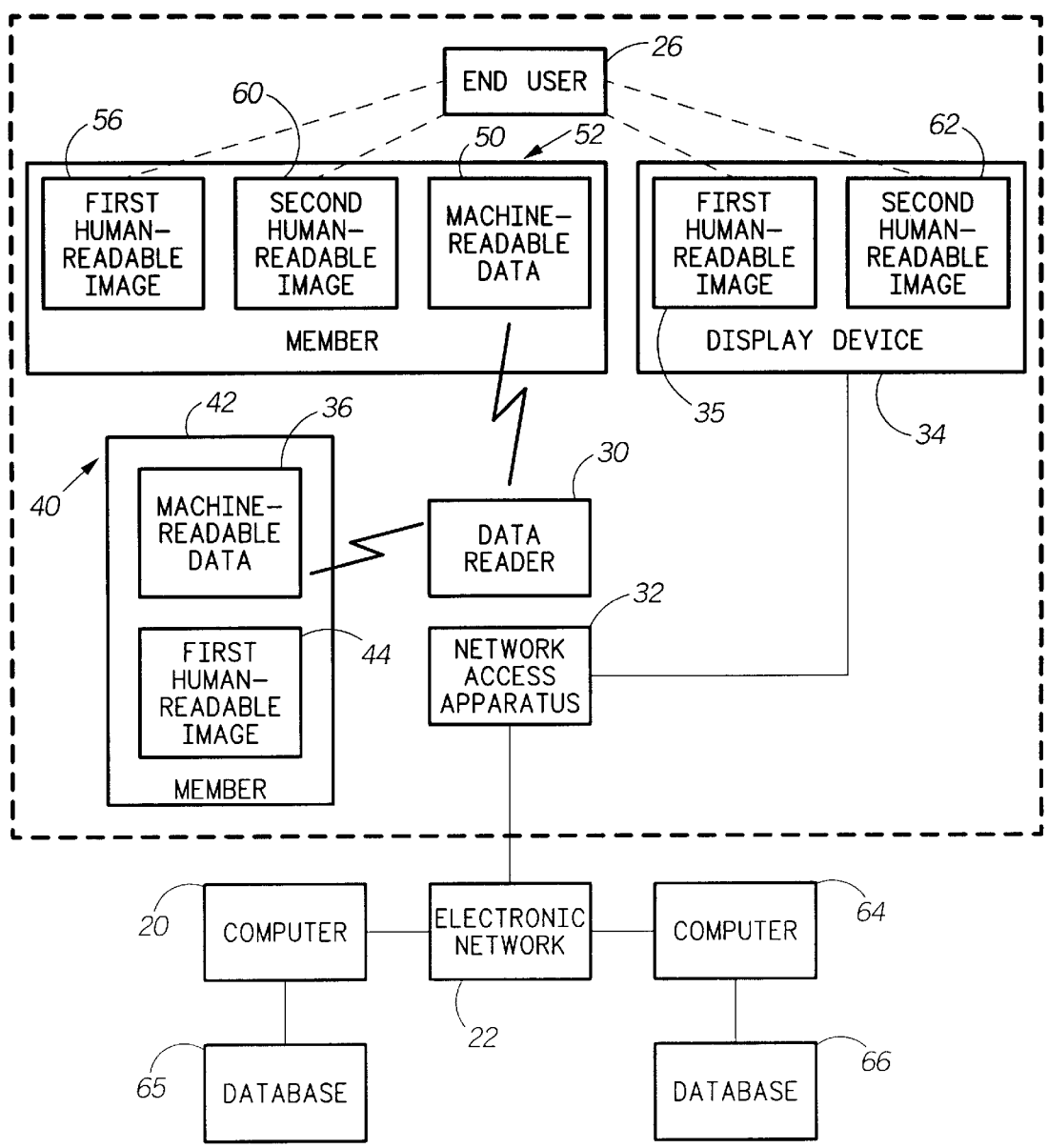
FIG. 1 is a block diagram of an embodiment of a transaction system in accordance with the present invention.

FIG. 1 is a block diagram of an embodiment of a transaction system in accordance with the present invention. The transaction system includes a computer 20 in communication with an electronic network 22. The computer 20 includes a server or like processing apparatus which serves as a node in the electronic network 22.

Preferably, the electronic network 22 includes a wide area network such as the Internet, the World Wide Web, or an online service to provide accessibility to the computer 20 for a wide geographical area. Other examples of the electronic network 22 include but are not limited to: an intranet, a local area network, a telephone network such as a public switched telephone network, a cellular telephone network, a personal communication system (PCS) network, a television network such as a cable television system, a paging network such as a local paging network, a regional paging network, a national paging network, or a global paging network, and a wireless data network such as a satellite data network or a local wireless data network.

The computer 20 receives transaction data generated at a user location 24 via the electronic network 22. Typically, the user location 24 is remotely located from the computer 20. For example, the user location 24 can be located in another city, another state, or another country with respect to the location of the computer 20.

In a first embodiment, the transaction data includes a first data element indicating an item in a transaction and second data element indicating a party of the transaction. The item in the transaction can include: (i) merchandise such as a product, goods, or commodities; (ii) a statement of charges such an invoice or a bill; (iii) a financial instrument such as a bond, shares of a stock, or shares of a mutual fund; (iv) derivatives such as options or futures; or (v) a service. The party of the transaction can include an end user 26 present at the user location 24, an organization associated with the end user 26, an organization associated with the user location 24, or an account associated with any of the above-listed entities.

The transaction data is generated at the user location 24 by a data reader 30 and/or a network access apparatus 32. Preferably, the data reader 30 includes an optical data reader to read printed data or human-viewable data (which may or may not be human-readable data) associated with the transaction data. Examples of the optical data reader include, but are not limited to, an optical scanner, a page scanner, a handheld scanner, a photograph reader, a business card reader, a bar code reader, a scanning wand, a linear CCD (charge coupled device) reader, a two-dimensional CCD reader, and a fax machine.

Alternatively, the data reader 30 can include a magnetic data reader to read magnetically-stored transaction data, or an electronic data reader to read electronically-stored transaction data. Embodiments of alternative data readers are described in the above-listed applications incorporated by reference into this application.

The network access apparatus 32 facilitates communication between the data reader 30 and the electronic network 22. The network access apparatus 32 can also serve to generate at least a portion of the transaction data, and/or to receive user-initiated events to generate at least a portion of the transaction data. The network access apparatus 32 can have a variety of forms, including but not limited to, a general purpose computer, a network computer, a network television, an Internet television, a portable wireless device, a television receiver, a game player, and a video recorder.

Regardless of its form, the network access apparatus 32 typically includes a processor in communication with at least one input device, a memory, and at least one storage device. The processor can include a microprocessor, an application specific integrated circuit, or other suitable integrated circuit. The memory can include a read-only memory and/or a random access memory in communication with the processor. The at least one input device can include a keyboard and/or a pointing device for receiving user-initiated events from the end user 26. The at least one storage device can include a floppy disk drive, a PC card storage device, an optical drive, a DVD drive, or a hard drive to store computer-readable data.

A display device 34, such as a monitor or a television, is responsive to the network access apparatus 32 to display visual information generated by the network access apparatus 32 and/or information communicated via the electronic network 22 (e.g. information from the computer 20). The display device 34 can include a liquid crystal display (LCD) or a cathode ray tube (CRT) display, for example, having an array of display elements or pixels for displaying textual information and graphical information. Preferably, the visual information displayed by the display device 34 includes a first human-readable image 35 associated with a service which facilitates the transaction. The first human-readable image 35 can include a logo which identifies the service to the end user 26.

Preferably, the data reader 30 reads machine-readable data 36 from a device 40 to generate the second data element indicating the party of the transaction. The device 40 includes a member 42 which supports the machine-readable data 36, and optionally, a first human-readable image 44. The first human-readable image 44 is associated with a service which facilitates the transaction. Preferably, the first-human readable image 44 includes the logo which identifies the service to the end user 26. Examples of the device 40 are subsequently described with reference to FIGS. 2 to 4.

Preferably, the machine-readable data 36 includes a printed code or a human-viewable code, such as a bar code, which encodes the second data element to identify the party in the transaction. The bar code can include a one-dimensional bar code or a two-dimensional bar code. Examples of one-dimensional bar codes include, but are not limited to, 3 of 9, UPC-A, UPC-E, Code 128, Codabar, MSI, Extended 3 of 9, Code 93, Extended Code 93, Industrial 2 of 5, Standard 2 of 5, Code 11, and UCC/EAN-128. Examples of two-dimensional bar codes include, but are not limited to, DataMatrix and PDF417. Although bar codes are human-viewable, they are practically unreadable by many humans.

Regardless of how the second data element is encoded by the machine-readable data 36, it is preferred that the second data element include a personal identification code such as a personal identification number to identify the end user 26, an organization, or an account. In an exemplary embodiment, the personal identification code is time-varying and nonpredictable by unauthorized parties.

Alternatively, the second data element is generated within the network access apparatus 32. In this case, the second data element can be prestored in the network access apparatus 32 or can be generated by a code generator associated with the network access apparatus 32. Preferably, the code generator generates the second data element which is time-varying and nonpredictable by unauthorized parties.

Optionally, the data reader 30 reads machine-readable data 50 from a device 52 to generate the first data element is associated with the item subject to the transaction. The device 52 includes a support member 54 which supports the machine-readable data 50, and optionally, a first human-readable image 56 and a second human-readable image 60.

As with the first human-readable images 35 and 44, the first human-readable image 56 is associated with the service which facilitates the transaction. Preferably, the first human-readable image 56 includes the logo which identifies the service to the end user 26. The first human-readable image 56 is similar to, and preferably equivalent to, the first human-readable image 35.

The second human-readable image 60 includes an image associated with a transaction item. The second human-readable image 60 can include a graphical image of the item itself, textual information describing the item, a price associated with the item, and/or a logo for the item or for an organization associated with the item. Examples of the device 52 are subsequently described with reference to FIGS. 5 to 7.

Alternatively, the first data element is generated in response to a user-initiated event received by an input device of the network access apparatus 32. In this case, the end user 26 can select the item and initiate a transaction based upon a second human-viewable image 62 displayed by the display device 34. As with the second human-readable image 60, the second human-readable image 62 can include a graphical image of the item itself, textual information describing the item, a price associated with the item, and/or a logo for the item or for an organization associated with the item. The item can be selected by a point and click operation using a pointed device or by depressing one or more keys of the network access apparatus 32, for example.

Regardless of how the transaction data is produced, the network access apparatus 32 communicates the transaction data to the computer 20 via the electronic network 22. Preferably, the transaction data is encrypted by the network access apparatus 32 prior to its transmission via the electronic network 22. In this case, the computer 20 decrypts data received from the electronic network 22 to recover the transaction data.

The computer 20 selectively approves or disapproves the transaction based upon the second data element. The approval or disapproval of the transaction is based upon a step of authenticating the second data element. The second data element can be authenticated locally by the computer 20 or remotely by a computer 64.

If done locally, the computer 20 approves the transaction by comparing the second data element and other associated data to entries in a database within or in communication with the computer 20. Based upon the comparison, the computer 20 determines the authenticity of the transaction party. If authentic, the transaction is approved. If not authentic, the transaction is disapproved.

If authenticated remotely, the computer 20 approves the transaction by sending a first message based upon the second data element to the computer 64. The computer 64 compares the second data element and other associated data to entries in a database associated with the computer 64, and either accepts or rejects the authenticity of the transaction party based upon the comparison. The computer 64 sends a second message indicating either an acceptance or a rejection of the authenticity of the transaction party to the computer 20. The computer 20 receives the second message and either approves or disapproves the transaction based thereupon.

Preferably, the computer 64 serves to authenticate transaction parties for a plurality of computers associated with the electronic network 22. The computer 64 preferably maintains the database of personal identification codes for a plurality of accounts of end users and/or organizations.

After approving the transaction, the computer 20 creates a record of the transaction. The record of the transaction includes data representative of the date of the transaction, the time of the transaction, the party initiating the transaction, the item, a party associated with the item, and a charge amount for the transaction.

Additionally, the computer 20 can initiate an action to be performed based upon the transaction. Examples of actions include, but are not limited to, sending an item to the party, preparing an item for pick-up by the party, providing a service for the party, accounting that a bill has been paid by the party, or sending a receipt to the party.

Additionally, the herein-described transaction system can be used to perform a second preferred transaction method. In this case, the computer 64 receives transaction data via the electronic network 22. The transaction data includes a first data element indicating a first party of a transaction and a second data element indicating a second party of the transaction. The first party includes a creditor, a seller, a merchant, a manufacturer, a payee, or other like entity which is to receive money in the transaction. The second party includes a debtor, a purchaser, a buyer, or other like entity which is to spend money in the transaction. The second party of the transaction can include an end user 26 present at the user location 24, an organization associated with the end user 26, an organization associated with the user location 24, or an account associated with any of the above-listed entities.

The transfer of money from the second party to the first party can be based upon, or in return for, any of the herein-described examples of transaction items. For example, the second party may wish to purchase an item from the first party or to pay a bill from the first party.

The first data element can be generated at the user location 24 by reading the machine-readable data 50 from the device 52 using the data reader 30. In this case, the machine-readable data 50 encodes data which identifies the first party.

Alternatively, the first data element may be generated in response to a user-initiated event received by an input device of the network access apparatus 32. In this case, the end user 26 can select the first party based upon the second human-viewable image 62 displayed by the display device 34. The second human-readable image 62 can include a graphical image such as a logo associated with the first party, or textual information such as a name associated with the first party. The first party can be selected by a point and click operation using a pointed device or by depressing one or more keys of the network access apparatus 32, for example.

The second data element is generated at the user location 24 using the data reader 30 and/or the network access apparatus 32 in a manner described earlier.

The computer 64 authenticates the second data element to allow or disallow the transaction. If the second data element is authentic, the computer 64 sends a message indicating the transaction to the first party. The message can include data representative of a date of the transaction, a time of the transaction, a name associated with the second party, an address associated with the second party, an electronic address associated with the second party, the item, and a transaction amount. Optionally, the computer 64 directs that an account for the first party be credited by the transaction amount, and an account for the second party be debited by the transaction amount.

In response to receiving the message, the first party can perform an action based upon the transaction. For example, the first party can send an item to the second party, prepare an item for pick-up by the second party, provide a service to the second party, account that a bill has been paid, or send a receipt to the second party.

If the second data element is not authentic, the transaction is disallowed. In this case, the computer 64 can send a message via the electronic network 22 to the network access apparatus 32 to indicate to the end user 26 that the transaction was disallowed.

Figure 2:
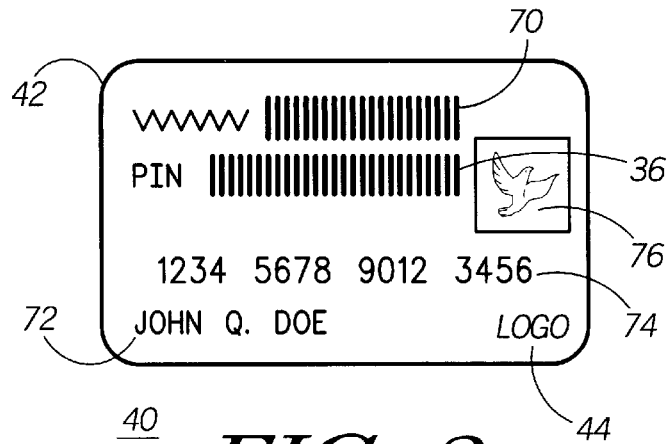
FIG. 2 is a view of a first example of the device 40 described with reference to FIG. 1.

FIG. 2 is a view of a first example of the device 40 described with reference to FIG. 1. The member 42 of the device 40 includes a substantially flat substrate formed of a dielectric or nonmagnetic material such as paper, cardboard, or plastic. The member 42 is sized for carrying within a wallet, a purse, or a pocket of the end user 26. Preferably, the member 42 is shaped and sized as a credit card or a debit card for this purpose. Alternatively, the member 42 can have shapes and sizes of other cards, including but not limited to, a business card, a smart card, an index card, a trading card, or a playing card.

The machine-readable data 36 includes a bar code supported by the member 42. The bar code encodes a personal identification code for the end user 26 for performing transactions over the electronic network 22. The first human-readable image 44 includes a logo for the transaction service provided by either the computer 20 or the computer 64.

Optionally, the member 42 further supports machine-readable data 70 for linking the network access apparatus 32 to a resource provided by the computer 64. Preferably, the machine-readable data 70 includes a bar code encoding an electronic address such as a URL (uniform resource locator) or an IP (Internet Protocol) address. The electronic address can be for a resource or a destination (such as a Web page) associated with the service provided by the computer 64.

The machine-readable data 70 can generally include any of the machine-readable data for network navigation devices described in the above-listed patent application references which are incorporated by reference into the present application.

Optionally, the device 40 further serves as a credit card, a debit card, a charge card, or an automatic teller machine (ATM) card. In this case, the member 42 can further support: (i) a name 72 of a party such as the end user 26; (ii) a card number 74 such as a credit card number, a debit card number, a charge card number, or an ATM card number associated with the party; (iii) a hologram 76 for authenticating the device 40 at a point of sale; (iv) a magnetic stripe (not illustrated) on an opposite side of the member 42; and (v) a picture of the end user 26. Preferably, the name 72 and the card number 74 are printed with raised letters and numerals in accordance with a standard credit card. Additionally, the support member 42 can support any other information to be disposed on a credit card or other financial card, such as a photo ID (not shown) of the end user 26.

Figure 3:
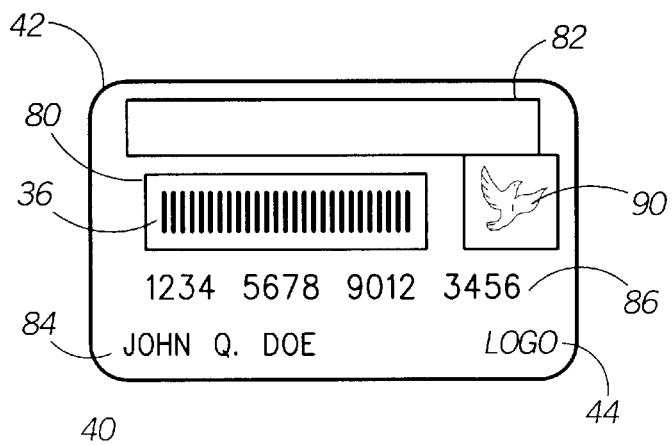
FIG. 3 is a view of a second example of the device 40 described with reference to FIG. 1.

FIG. 3 is a view of a second example of the device 40 described with reference to FIG. 1. The device 40 includes an embodiment of an apparatus described in the reference entitled "Bar Code Display Apparatus" which is incorporated by reference into this disclosure. In this example, the member 42 of the device 40 includes a card-shaped housing having at least one dimension, and preferably two or more dimensions, sized as a credit card or the like. The member 42 houses or supports a time-varying nonpredictable code generator (not illustrated) and a display device 80. The time-varying nonpredictable code generator and the display device 80 are powered by either a solar battery 82, an internal battery (not illustrated), or a plastic battery integrated with the housing.

The display device 80 is responsive to the time-varying nonpredictable code generator to display the machine-readable data 36 as a time-varying nonpredictable bar code. The time-varying nonpredictable bar code can be displayed using a one-dimensional bar code or a two-dimensional bar code such as those previously described. The bar code encodes a time-varying nonpredictable personal identification code for the end user 26 for performing transactions over the electronic network 22.

Preferably, the time-varying nonpredictable code generator includes any of the code generators described in U.S. Pat. Nos. 4,599,489, 4,720,860, and 5,168,520 which are hereby incorporated by reference into this disclosure. Optionally, the time-varying nonpredictable code generator is synchronized to a second code generator associated with the computer 20 and/or the computer 64. In general, the time-varying nonpredictable code generator can generate a nonpredictable code using either a random process or a pseudorandom process as described in the application entitled "Bar Code Display Apparatus".

Optionally, the display device 80 can further display a prestored bar code image for linking the network access apparatus 32 to a resource provided by the computer 64. Preferably, the prestored bar code image includes an electronic address such as a URL (uniform resource locator) or an IP (Internet Protocol) address for a resource (such as a Web page) associated with the service provided by the computer 64. In general, the prestored bar code image can include any of the machine-readable data for network navigation devices described in the above-listed patent application references which are incorporated by reference into this disclosure. To identify the transaction service, the first human-readable image 44 includes a logo.

As with the example of FIG. 2, the device 40 optionally serves as a credit card, a debit card, a charge card, or an ATM card. In this case, the member 42 can further support: (i) a name 84 of a party such as the end user 26; (ii) a card number 86 such as a credit card number, a debit card number, a charge card number, or an ATM card number associated with the party; (iii) a hologram 90 for authenticating the device 40 at a point of sale; (iv) a magnetic stripe (not illustrated) on an opposite side of the member 42; and (v) a picture of the end user 26. Preferably, the name 84 and the card number 86 are printed with raised letters and numerals as a standard credit card. If desired, the device 40 can have a common account for electronic network transactions and credit card, debit card, charge card, or automatic teller machine (ATM) card transactions.

Figure 4:
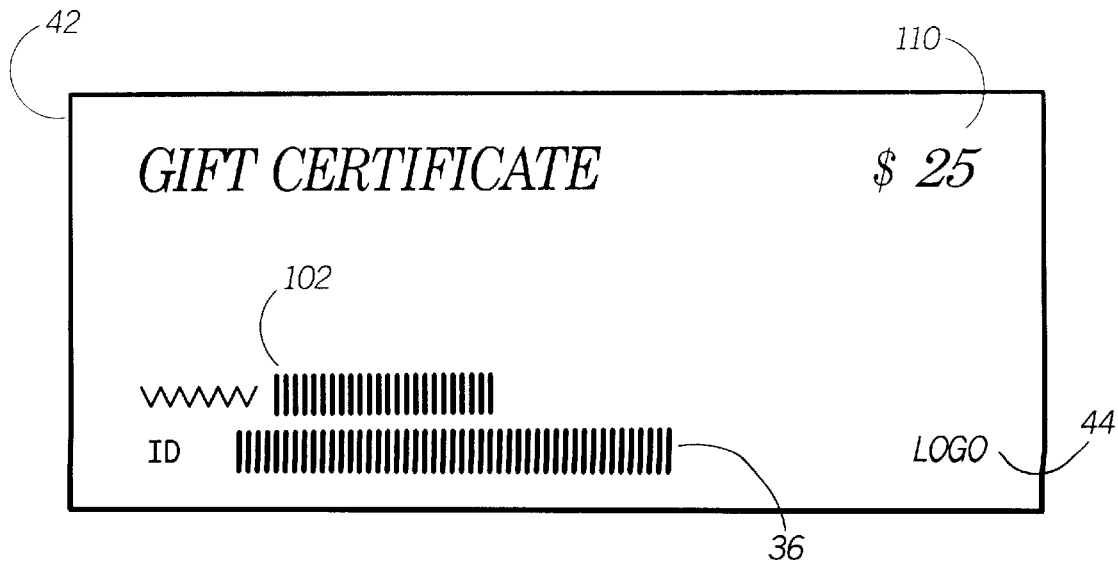
FIG. 4 is a view of a third example of the device 40 described with reference to FIG. 1.

FIG. 4 is a view of a third example of the device 40 described with reference to FIG. 1. In this example, the device 40 is amenable for use in prepaid transactions. For example, the device 40 can be purchased as a gift certificate or the like to facilitate one or more prepaid transactions at a later time. The transactions can be performed by the purchaser of the device 40, or by a recipient of the device 40. Optionally, the device 40 can be designated only for a single use.

The support member 42 of the device 40 includes a substantially flat substrate formed of a dielectric material such as paper, cardboard, or plastic. Printed onto the support member 42 are the machine-readable data 36, the first human-readable image 44, and an indication 100 of a prepaid amount. The machine-readable data 36 includes a bar code which identifies the device 40. The first human-readable image 44 includes a logo which identifies a transaction service.

Also printed onto the member 42 is a bar code 102 for linking the network access apparatus 32 to a resource provided by the computer 20 or the computer 64. Preferably, the bar code 102 encodes an electronic address such as a URL (uniform resource locator) or an IP (Internet Protocol) address for a resource (such as a Web page) associated with either the computer 20 or the computer 64. In general, the bar code 102 can include any of the machine-readable data for network navigation devices described in the above-listed patent application references which are incorporated by reference into this disclosure.

The prepaid transactions can be monitored in accordance with the teachings in the reference entitled "Methods and Systems for Providing a Resource in an Electronic Network", which is incorporated by reference into this disclosure.

Figure 5:
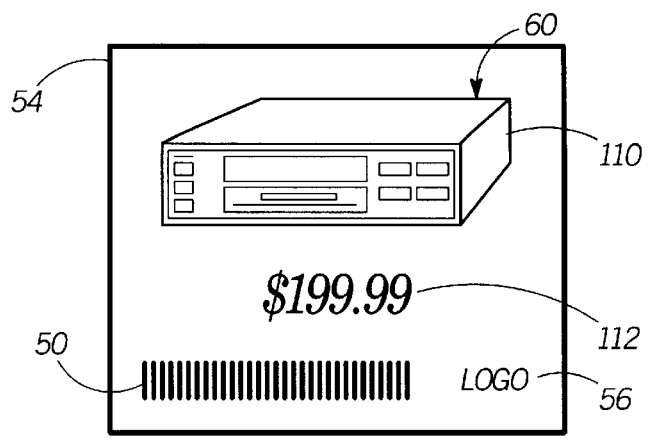
FIG. 5 is a view of a first example of the device 52 described with reference to FIG. 1.

FIG. 5 is a view of a first example of the device 52 described with reference to FIG. 1. The member 53 of the device 52 includes a substantially flat substrate formed of a dielectric material such as paper, cardboard, or plastic. Printed onto the member 53 are the machine-readable data 50, the first human-readable image 56, and the second human-readable image 60.

The second human-readable image 60 includes a graphical image 110 of the item itself and a price 112 associated with the item. The machine-readable data 50 includes a bar code for linking the network access apparatus 32 to a resource for purchasing the item. The first human-readable image 56 includes a logo identifying a transaction service to purchase the item. Since the logo corresponds to the logos illustrated in FIGS. 2 to 4, the end user 26 recognizes that the examples of the device 40 described in FIGS. 2 to 4 can be used to purchase the item via the electronic network 22.

The end user 26 can purchase the item by: (i) linking to a destination which provides the transaction service (e.g. by reading the bar code 70 in FIG. 2 or the bar code 102 in FIG. 4 using the data reader 30); (ii) reading the machine-readable data 50 using the data reader 30; and (iii) reading the machine-readable data 36 from the device 40. Alternatively, step (i) can be eliminated if the machine-readable data 50 initiates a link to the computer 20. The network access apparatus 32 communicates the data via the electronic network 22 to facilitate the purchase.

Figure 6:
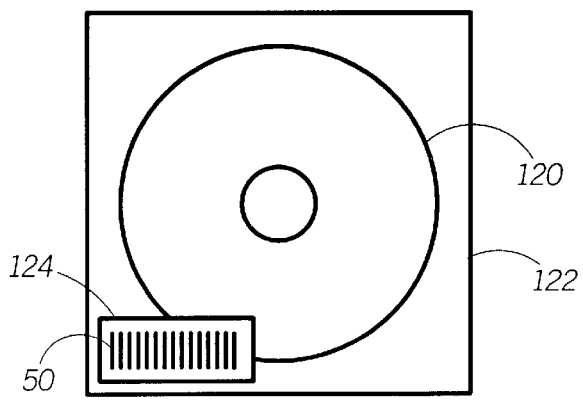
FIG. 6 is a view of a second example of the device 52 described with reference to FIG. 1.

FIG. 6 is a view of a second example of the device 52 described with reference to FIG. 1. The member 54 of the device 52 includes either an item 120, a housing 122 for the item 120, packaging material for the item 120, or a price sticker 124 associated with the item 120. In this example, the item 120 is illustrated as a compact disk or a DVD. The compact disk or DVD can contain computer-readable data, audio data such as music, or video data such as a movie, for example. The housing 122 includes a jewel case for the compact disk or the DVD. It is noted, however, that other items and housings are contemplated for the device 52.

The packaging material can include a wrapper or a package to contain the housing 122 and/or the item 120. Alternatively, the packaging material can include a sheet of material, a booklet, an instruction manual associated with the item 120. The price sticker 124 can be attached to either the item 120, the housing 122, or the packaging material.

The machine-readable data 50 supported by the member 54 includes a bar code which identifies the item 120. Preferably, the bar code indicates the type of product or item being identified, a manufacturer of the item, and a product number associated with the item. As such, it is preferred that the bar code includes a UPC code, such as a UPC-A code or a UPC-E code, presently associated with most products. Optionally, the bar code can further include a code for a country of origin of the item. In this case, the bar code can include an EAN/JAN code such as an EAN/JAN-8 code or an EAN/JAN-13 code.

The end user 26 purchases the item 120 by: (i) linking to a destination which provides the transaction service (e.g. by reading the bar code 70 in FIG. 2 or the bar code 102 in FIG. 4 using the data reader 30); (ii) reading the machine-readable data 50 using the data reader 30; and (iii) reading the machine-readable data 36 from the device 40. The network access apparatus 32 communicates the data via the electronic network 22 to facilitate the purchase of the item 120.

Figure 7:
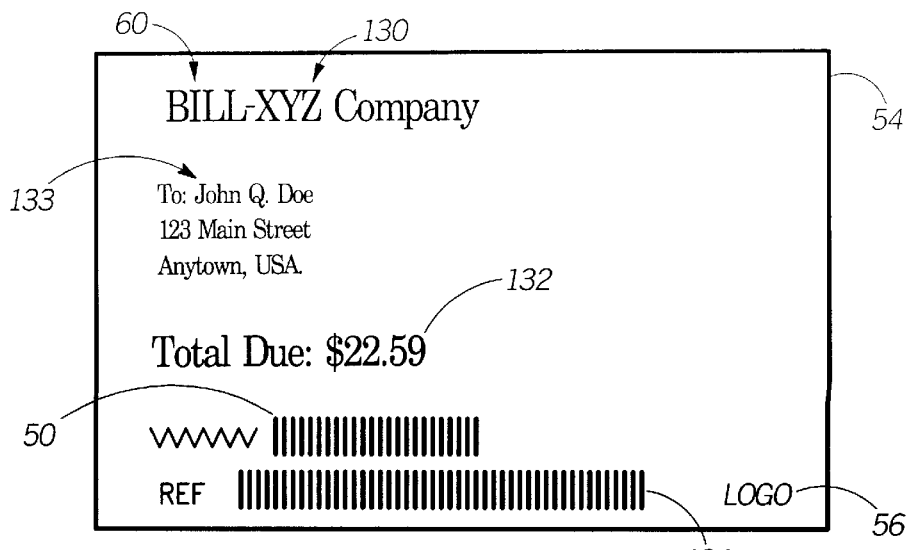
FIG. 7 is a view of a third example of the device 52 described with reference to FIG. 1.

FIG. 7 is a view of a third example of the device 52 described with reference to FIG. 1. In this example, the device 52 includes a statement of charges, such an invoice or a bill, from a creditor.

The member 54 of the device 52 includes a substantially flat substrate formed of a dielectric material such as paper, cardboard, or plastic. Printed onto the member 54 are the machine-readable data 50, the first human-readable image 56, and the second human-readable image 60.

The second human-readable image 60 includes an indication 130 of the creditor, an indication 132 of an amount due to the creditor, and an indication 133 of the debtor (such as the name of the end user 26). The machine-readable data 50 includes a bar code for linking the network access apparatus 32 to a resource for paying the bill. The first human-readable image 56 includes a logo identifying a transaction service which can be used to pay the bill. Since the logo corresponds to the logos illustrated in FIGS. 2 to 4, the end user 26 recognizes that the examples of the device 40 described in FIGS. 2 to 4 can be used to pay the bill via the electronic network 22.

Using the data reader 30, the end user 26 pays the bill by: (i) reading the machine-readable data 50 to link the network access apparatus 32 to a resource for paying the bill; (ii) reading a bar code 134 indicating a reference code for the bill; and (iii) reading the machine-readable data 36 from the device 40. The network access apparatus 32 communicates the data via the electronic network 22 to facilitate the payment.

Figure 8:
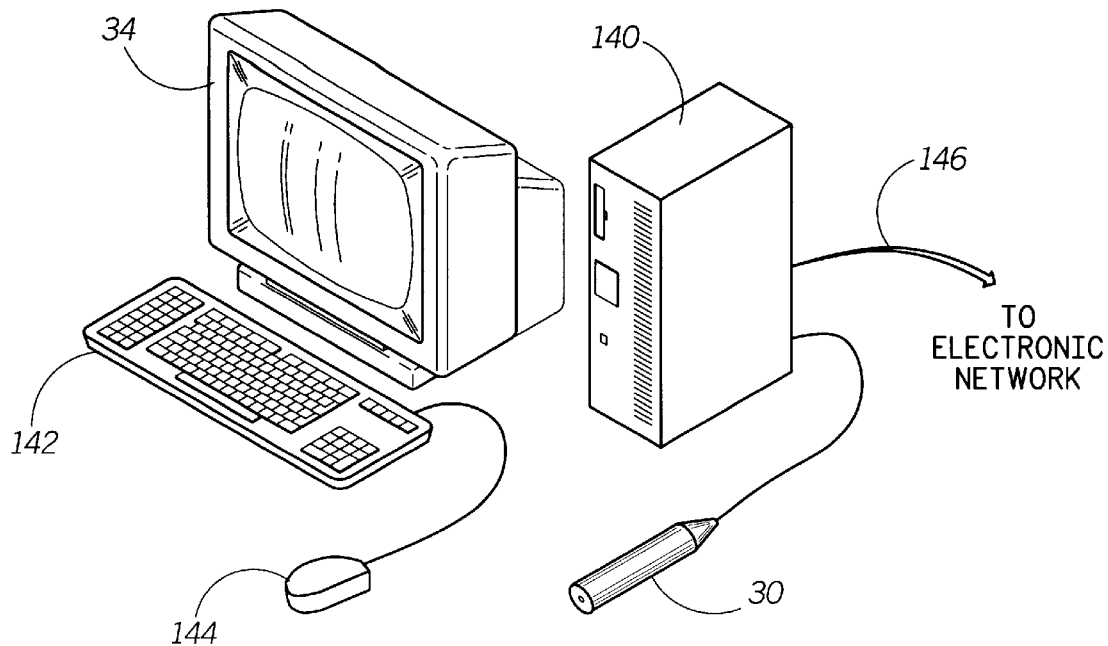
FIG. 8 is an illustration of an example of the data reader and the network access apparatus at the user location.

FIG. 8 is an illustration of an example of the data reader 30 and the network access apparatus 32 at the user location. In this example, the network access apparatus 32 comprises a personal computer 140, and at least one input device including a keyboard 142 and a mouse 144. The display device 34 comprises a monitor connected to a video port of the personal computer 140. The data reader 30 includes a bar code reader connected to a serial port of the personal computer 140.

The personal computer 140 includes a modem, a network adapter, or other transceiver for communicating with the electronic network 22. The modem or the network adapter can communicate with the electronic network 22 via a line 146 such as a telephone line, an ISDN line, a coaxial line, a cable television line, a fiber optic line, a computer network line, or the like. Alternatively, the modem or the network adapter can wirelessly communicate with the electronic network 22.

Figure 9:
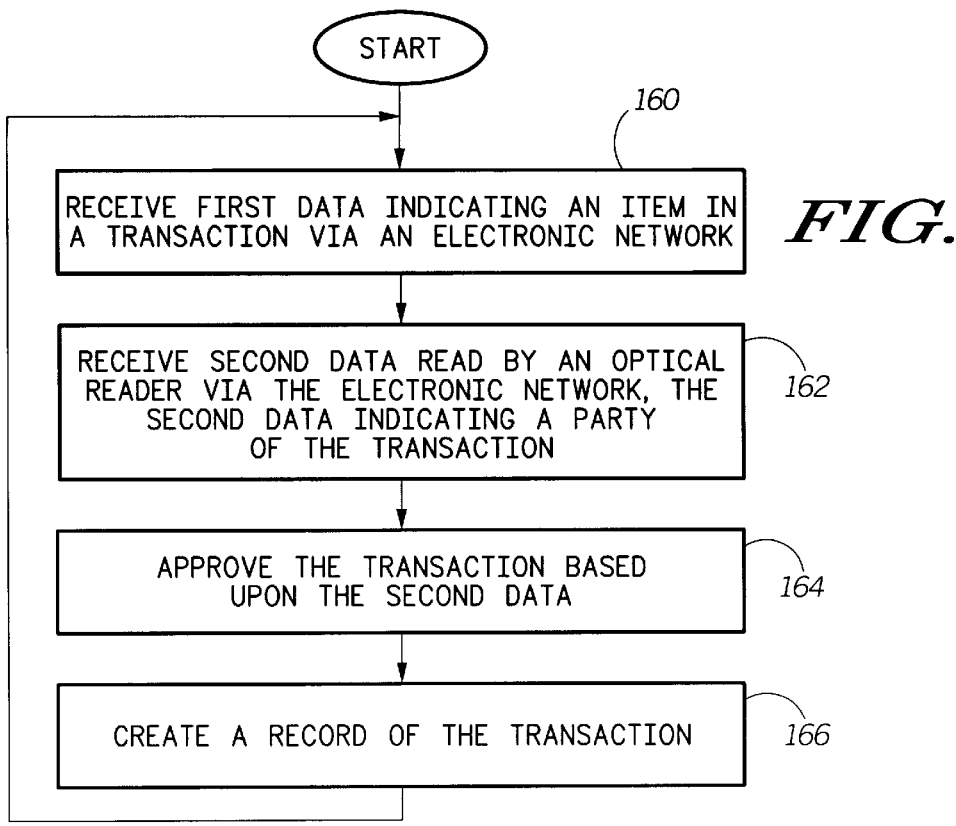
FIG. 9 is a flow chart summarizing steps performed in an embodiment of a transaction method.

FIG. 9 is a flow chart summarizing steps performed in an embodiment of a transaction method. As indicated by block 160, the method includes a step of receiving first data via the electronic network 22. The first data indicates an item in a transaction.

As indicated by block 162, the method includes a step of receiving second data via the electronic network 22. The second data indicates a party of the transaction. The second data is read by an optical data reader in communication with the electronic network 22.

As indicated by block 164, the method includes a step of approving the transaction based upon the second data. The step of approving can be performed locally, or can be performed remotely by sending a first message based upon the second data and receiving a second message which authenticates the second data.

As indicated by block 166, the method includes a step of creating a record of the transaction. Preferably, the record includes data representative of at least two of a date of the transaction, a time of the transaction, the party, the item, and a charged amount.

Figure 10:
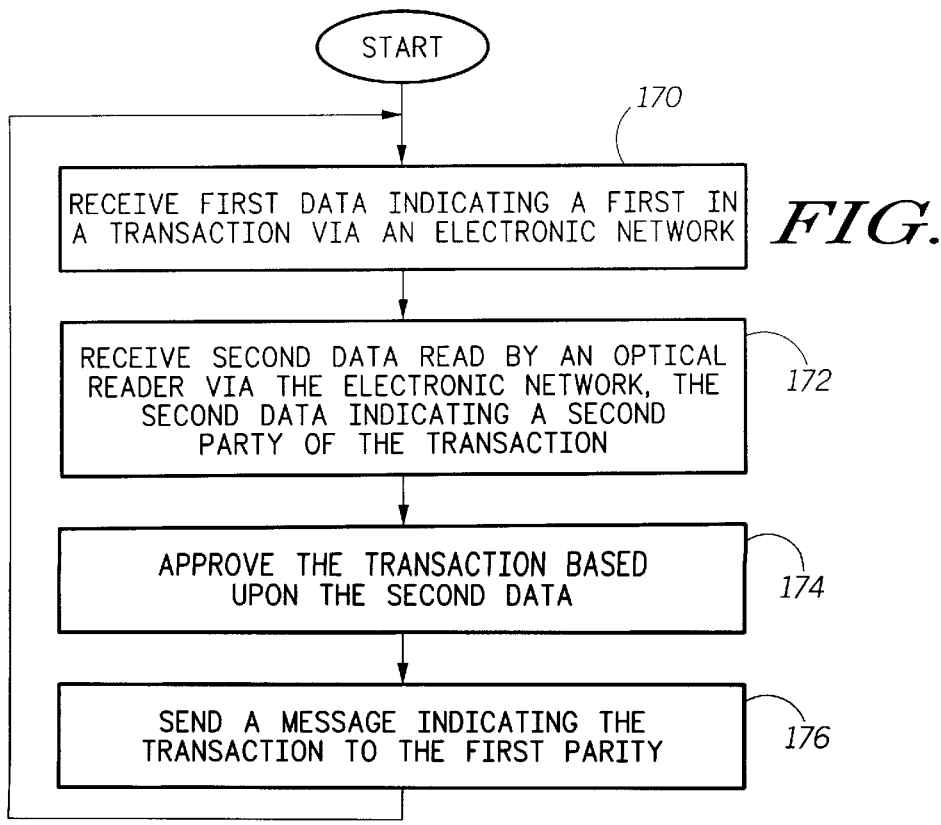
FIG. 10 is a flow chart summarizing steps performed in another embodiment of a transaction method.

FIG. 10 is a flow chart summarizing steps performed in another embodiment of a transaction method. As indicated by block 170, the method includes a step of receiving first data via the electronic network 22. The first data indicates a first party in a transaction.

As indicated by block 172, the method includes a step of receiving second data via the electronic network 22. The second data indicates a second party of the transaction. The second data is read by an optical data reader in communication with the electronic network 22.

As indicated by block 174, the method includes a step of approving the transaction based upon the second data. The step of approving can be performed locally, or can be performed remotely by sending a first message based upon the second data and receiving a second message which authenticates the second data.

As indicated by block 176, the method includes a step of sending a message indicating the transaction to the first party. Preferably, the message includes data representative of at least two of a date of the transaction, a time of the transaction, a name associated with the second party, an address associated with the second party, an electronic address associated with the second party, the item, and a charged amount.

Figure 11:
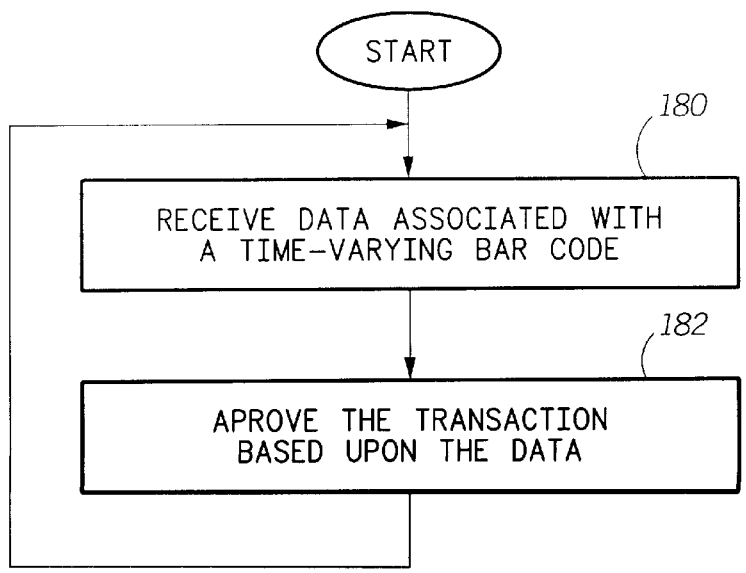
FIG. 11 is a flow chart summarizing steps performed in an embodiment of an authentication method in accordance with the present invention.

FIG. 11 is a flow chart summarizing steps performed in an embodiment of an authentication method in accordance with the present invention.

As indicated by block 180, the method includes a step of receiving data associated with a time-varying bar code. The data can be received via the electronic network 22 or another network by the computer 64. Preferably, the data is read by a bar code reader at the user location 24.

As indicated by block 182, the method includes a step of approving a transaction based upon the data. The transaction is approved or disapproved based upon a step of comparing the data to data generated by a code generator synchronized to the time-varying bar code.

Thus, there has been described herein several embodiments including preferred embodiments of transaction methods, systems, and devices.

Because the various embodiments of the present invention authenticate an end user in a transaction based upon machine-readable data read by a data reader at the end user's location, they provide a significant improvement in that the end user does not have to recall a personal identification number to perform the transaction.

Additionally, the various embodiments of the present invention authenticate an end user using a time-varying bar code to foil unauthorized transactions using a fixed personal identification code.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A transaction method comprising the steps of:
providing a computer accessible via an electronic network at an electronic address encoded by a bar code supported by a member;
receiving a first data element by the computer and via the electronic network, the first data element read by a bar code reader in communication with the electronic network, the first data element indicating a first party of a transaction;
receiving a second data element by the computer and via the electronic network, the second data element read from the member by the bar code reader in communication with the electronic network, the second data element indicating a second party of the transaction;
authenticating the second data element; and upon authenticating the second data element, sending a message based on the transaction to the first party.

2. The transaction method of claim 1 wherein the message includes data representative of at least two of a date of the transaction, a time of the transaction, a name associated with the second party, an address associated with the second party, an electronic address associated with the second party, the item, and a charged amount.

3. A transaction system comprising:
a computer in communication with an electronic network to receive a first data element and a second data element both read by a bar code reader, the first data element indicating a first party of a transaction, the second data element indicating a second party of the transaction;
wherein the computer authenticates the second data element and sends a message indicating the transaction to the first party upon authenticating the second data element; and
wherein the computer is accessible via the electronic network at an electronic address encoded by a bar code supported by a member having the second data element.

4. The transaction system of claim 3 wherein the message includes data representative of at least two of a date of the transaction, a time of the transaction, a name associated with the second party, an address associated with the second party, an electronic address associated with the second party, the item, and a charged amount.

5. A transaction device comprising:
a member;
a first bar code supported by the member, the first bar code providing an instruction for linking to a destination in an electronic network; and
a second bar code supported by the member, the second bar code providing an identification code for authenticating a transaction at the destination.

6. The transaction device of claim 5 wherein the first bar code encodes an electronic address for the destination.

7. The transaction device of claim 6 wherein the electronic address includes at least a portion of a uniform resource locator.

8. The transaction device of claim 5 further comprising a human-readable image supported by the member, the human-readable image associated with the destination.

9. The transaction device of claim 5 wherein the member is credit-card-shaped.

10. The transaction device of claim 5 further comprising a display device supported by the member, the display device to display the second bar code.

11. A transaction device comprising:
a member selected from the group consisting of a credit card, a debit card, an automatic teller machine card, and a charge card;
a first bar code supported by the member, the first bar code encoding an electronic address of a destination in an electronic network; and
a second bar code supported by the member, the second bar code providing an identification code for authenticating a transaction at the destination.

12. The transaction device of claim 11 further comprising a display device supported by the member, the display device to display the second bar code.

13. A method of facilitating a transaction between a first party and a second party, the method comprising the steps of:
providing a computer accessible via an electronic network;
providing a first member which supports a first bar code, a second bar code and a human-readable image, the first bar code encoding an electronic address for linking to the computer, the second bar code encoding an identification code for the second party, the human-readable image including a transaction service logo;
receiving, via the electronic network, a link to the computer based upon the first bar code;
receiving, by the computer and via the electronic network, the identification code read from the second bar code;

receiving, by the computer and via the electronic network, data read from a third bar code supported by a second member, the data indicating both an item in the transaction and the first party, the second member having a human-readable image which includes the transaction service logo;

approving the transaction based upon the identification code for the second party; and sending a message indicating the transaction to the first party.

14. The method of claim 13 wherein the third bar code is selected from the group consisting of a UPC code and an EAN/JAN code.

15. The method of claim 13 wherein the message includes data representative of a date of the transaction, a time of the transaction, a name associated with the second party, the item, and a charged amount.

16. The method of claim 13 wherein the second member supports a human-readable image of the item.

17. The method of claim 13 wherein the electronic network comprises an internet.

18. The method of claim 13 wherein the electronic network comprises an intranet.

19. A method of facilitating a transaction between a first party and a second party, the method comprising the steps of:

providing a computer accessible via an electronic network;

providing a first member which supports a first bar code and a second bar code, the first bar code encoding an electronic address for linking to the computer, the second bar code encoding an item in the transaction;

receiving, via the electronic network, a link to the computer based upon the first bar code;

receiving, by the computer and via the electronic network, a data element indicating the item in the transaction from the second bar code;

receiving, by the computer and via the electronic network, a data element read from a third bar code supported by a second member, the third bar code encoding an identification code for the second party; and processing the transaction based upon at least the identification code.

20. The method of claim 19 wherein the first member supports a human-readable image including a transaction service logo, and wherein the second member supports a human-readable image including the transaction service logo.

21. The method of claim 19 wherein the first member comprises a printed invoice.

22. The method of claim 19 wherein the electronic network comprises an internet.

23. The method of claim 19 wherein the electronic network comprises an intranet.

* * * * *